AUDIO READOUT UNIT FOR A DIGITAL VOLTMETER

Filed Feb. 8, 1960 4 Sheets-Sheet 1

INVENTOR.
Robert V. Werner
Ernest S. Levy
BY Hugh L. Millis Jr.

AUDIO READOUT UNIT FOR A DIGITAL VOLTMETER

Filed Feb. 8, 1960 4 Sheets-Sheet 2

INVENTOR.
Robert V. Werner
Ernest S. Levy
BY Hugh L. Miller Jr.

AUDIO READOUT UNIT FOR A DIGITAL VOLTMETER

Filed Feb. 8, 1960 4 Sheets-Sheet 3

INVENTOR.
Robert V. Werner
Ernest S. Levy
BY Hugh L. Miller Jr.

AUDIO READOUT UNIT FOR A DIGITAL VOLTMETER

Filed Feb. 8, 1960 4 Sheets-Sheet 4

INVENTOR.
Robert V. Werner
Ernest S. Levy
BY [signature]

United States Patent Office 3,081,431

Patented Mar. 12, 1963

3,081,431

AUDIO READOUT UNIT FOR A DIGITAL VOLTMETER

Robert V. Werner, La Mesa, and Ernest S. Levy, San Diego, Calif., assignors to Cubic Corporation, San Diego, Calif., a corporation of California Filed Feb. 8, 1960, Ser. No. 7,438
10 Claims. (Cl. 324—99)

Figure 1A:
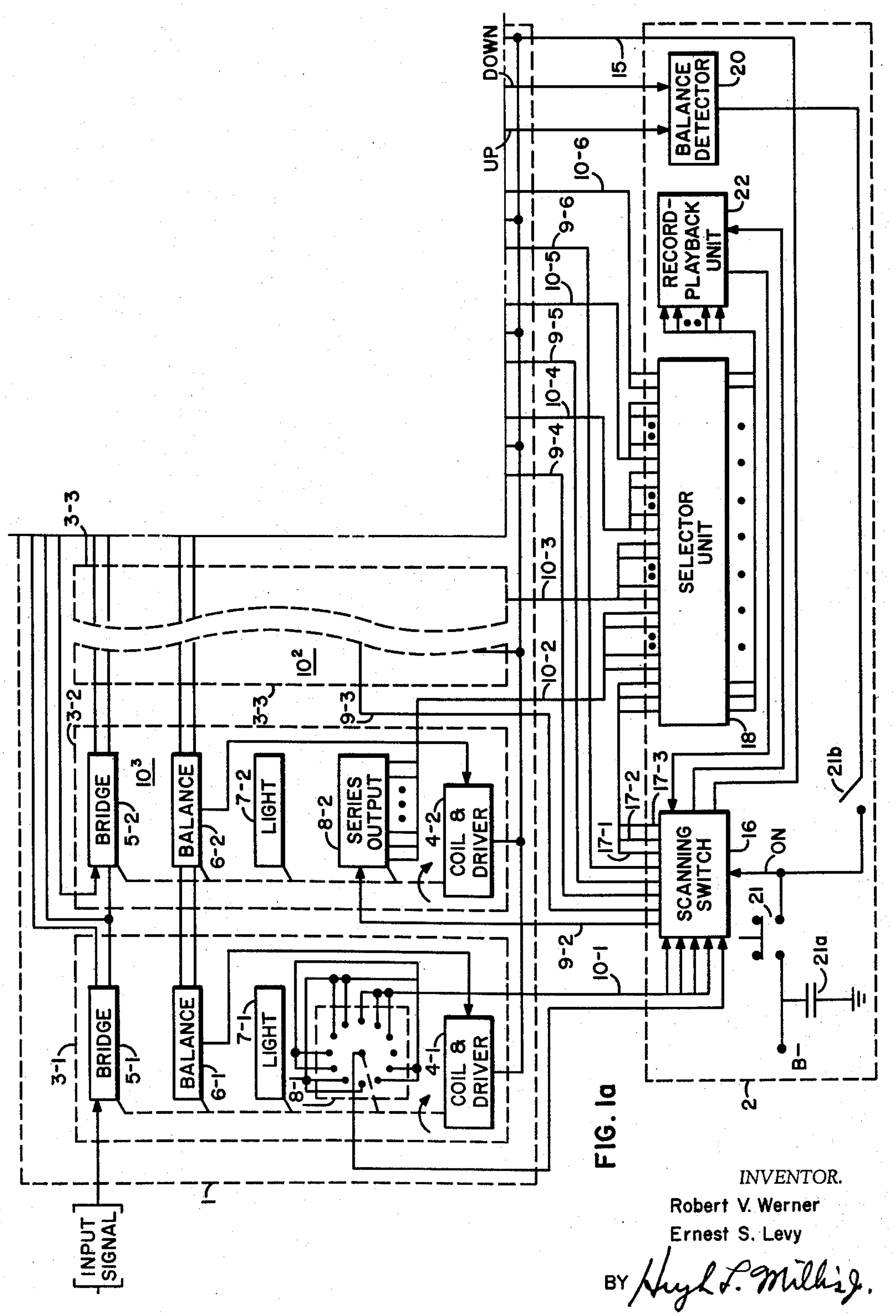

The present invention relates to an audio readout unit for a digital voltmeter and, more particularly, to an audio readout unit capable of producing output audio readings of the normal output voltage measured by a digital voltmeter unit.

One of the more recent developments in the general field of instrumentation has been the general introduction of digital voltmeters as substitutes, in some cases, for the older and more common moving-coil voltmeter types which present analog output readings. Such digital voltmeters, in general, produce considerably more accurate readings than the moving-coil type and, owing to the nature of their digital output display, provide readings which are read not only with greater ease but with considerably less error by operating personnel. Also, the output digital data is more readily applied to other digital devices, such as printers, digital computers, etc., as may be required in certain applications, than are the analog readings produced by analog voltmeters.

A number of different types of digital voltmeters have been produced, and the present invention is primarily concerned with an attachment for use with the so-termed self-balancing type of digital voltmeter. Even several varieties of the self-balancing type of digital voltmeter have been produced, but all are essentially similar in nature and each includes a series of multi-level stepping switches corresponding to range, polarity and the various decimal readout digits. The levels of these stepping switches are connected to form a bridge circuit, a balance logic circuit, a readout level for producing a visual output display, and, finally, a series output level for a print-out operation. In general, the bridge circuit formed in conjunction with the bridge levels of the stepping switches is arranged such that the particular position of the movable arms in the stepping switches at any time produces a bridge output signal whose magnitude corresponds to the voltmeter reading at that time. This bridge-produced voltage is then compared in a voltmeter control unit against the unknown input signal and produces output pulses on up and down output lines in accordance with whether the bridge or input voltage is the larger. These up and down pulses, as the case may be, are coupled through the balance logic circuitry to drive the various stepping switches, according to a prearranged logical plan, to establish null, that is, where the bridge-produced voltage exactly equals the input voltage. Whenever balance or null is obtained, the reading of the voltmeter will correspond exactly to the magnitude of the input signal.

The purpose of the audio readout unit, constituting the present invention, is to provide an audio readout corresponding to the visual readout and hence the magnitude of the input signal as measured by the voltmeter. The audio readout unit includes a scanning switch, a selector unit and a record-playback unit. The record-playback unit includes an endless magnetic tape loop having a total of 14 channels in engagement with 14 respective record-playback heads. The recordings on these respective channels represent "+" and "—," the "0" through "9" digits, "point" and "volts." Now the contacts of the series output level of the voltmeter stepping switch giving the range, or decimal point readout position, are connected to the various levels of this readout scanning switch in order that the word "point," representing the decimal point of the reading, may be inserted in the over-all readout value in accordance with its position in the voltmeter reading.

Upon initiation of a readout cycle, the scanning switch is activated and a signal applied from the range switch, based on its switch arm position, to one of the scanning switch levels. First, as the scanning switch steps, a signal will be applied by it to the movable switch arm of the voltmeter polarity switch to thereby cause the signal coming from either the "+" or "—" channel head, as determined by the polarity switch position, to be passed through an amplifier to a loudspeaker for an audio readout cycle. Next, the scanning stepping switch is energized to its next contact position, which, as determined by the range switch reading, may, for example, represent the most significant digit stepping switch of the voltmeter. The output signal of the record-playback head corresponding to this digit switch arm position will be selected by the selector unit and passed through the amplifier to the loudspeaker, with an ensuing audio output being produced. This scanning switch operation proceeds with the remaining digits, including the range-switch-produced word "point" being read out in its proper place, until the final contact row is contacted, at which time the word "volts" is presented for output reading.

Each word recorded around the endless tape requires one complete turn of the tape loop for readout, and a short, fiducial signal is produced each single turn of the loop which serves to activate the scanning switch to its next position so that completely synchronized readout cycles are maintained during consecutive steppings of the scanning switch. Accordingly, the output signal of the proper playback head is applied to the amplifier during each loop turn.

An automatic readout operation may be ordered which will repeat whenever the voltmeter reading is at null, that is, when the particular positions of the stepping switches accurately represent the input voltage magnitude. When this condition occurs, a balance detector circuit produces an output signal, representing null, which actuates the scanning switch which then starts the readout cycle and then proceeds automatically until its completion. Alternately, a pushbutton may be manually activated at any time which will both start a readout cycle and inhibit any further balancing operation of the voltmeter in order that the initial reading will be maintained without change during the remaining portion of the readout cycle.

The audio readout device, according to the present invention, includes a unique and highly useful feature in that the individual tracks around the tape unit may be recorded by the operator during a record operation, and all channels thus recorded may then be compared and checked by the operator as to fidelity, signal-to-noise ratio, volume levels, etc., during a monitor operation. In particular, a three-position switch is manually operated to select which particular operation of record, monitor, or playback is desired. Then, a 14-contact switch, whose 14 switch contacts correspond to the respective 14 channels along the endless tape, is manually positioned for both the record and monitor operations to correspond to the particular channel of interest. Thus, the operator may record the various channels, monitor them for quality, and then have either an automatic or manually-selected readout operation.

The audio readout unit, according to the present invention, extends considerably the general utility of digital voltmeters. For example, a voltmeter reading may be taken in inaccessible or hazardous areas where normal visual readouts are either dangerous or highly inconvenient. As an example, continuous readings may be taken in areas of high radiation levels and the sound employed at a remote point for equipment monitoring purposes. As another example, a technician working on dangerously high voltage circuits may receive pertinent voltage readings audibly through the audio readout attachment of the present invention and thereby be able to maintain an uninterrupted visual inspection of the work area and hence greatly reduce the possibility of receiving lethal shocks. As another example, the audio readout may find utility in an operating room, since an audio readout of a patient's temperature, blood pressure, etc., may be made at regular or selected intervals and keep the surgeon app'rised of the patient's condition without distracting his attention from the operating table. Another general area of utility is found in types of work where the necessary light required for making visual readings is not always available. One example of this type of application would be in photographic darkrooms where solution temperatures, strengths, etc., could be audibly presented after approximately conversion to voltages for use by a digital voltmeter. Finally, remote points may be readily monitored over phone lines by placing the audio readings on the line and transmitting the sound to a distant point, where it is received and recorded.

It is, accordingly, the principal object of the present invention to provide an audio readout unit, for attachment to a digital voltmeter, capable of producing output audio readings of the voltage read by the digital voltmeter.

Another object of the present invention is to provide an audio readout unit for a digital voltmeter which is capable of producing output readings by playing back recorded digits which represent the instantaneous voltage reading of the voltmeter.

A further object of the present invention is to provide an audio readout unit for a digital voltmeter which is capable, upon demand, of scanning the voltmeter output reading in a digit-by-digit fashion and producing an audio output reading of the value of each digit at the time of its scan.

Still another object of the present invention is to provide an audio readout unit for attachment to a digital voltmeter which, either automatically or upon demand, successively scans the series of stepping switches of the digital voltmeter and produces audio output digit readings from a prior made magnetic recording, based on the individual switch arm positions of the stepping switches, the series of positions, in turn, representing the voltmeter reading.

A still further object of the present invention is to provide an audio readout unit for a digital voltmeter which successively scans the stepping switch positions of the voltmeter and produces output audio digit readings corresponding to the position of each stepping switch, and further inserts the decimal point in the audio output reading based on the position of the voltmeter range stepping switch.

Another object of the present invention is to provide an audio readout unit for attachment to a digital voltmeter which is capable, when actuated, for producing an output audio readout of the voltage then being read by the voltmeter, the readout unit having an automatic mode of operation where it is actuated whenever the voltmeter is at null, and a manually actuated mode during which any further balancing operation of the voltmeter is inhibited.

Figure 1B:
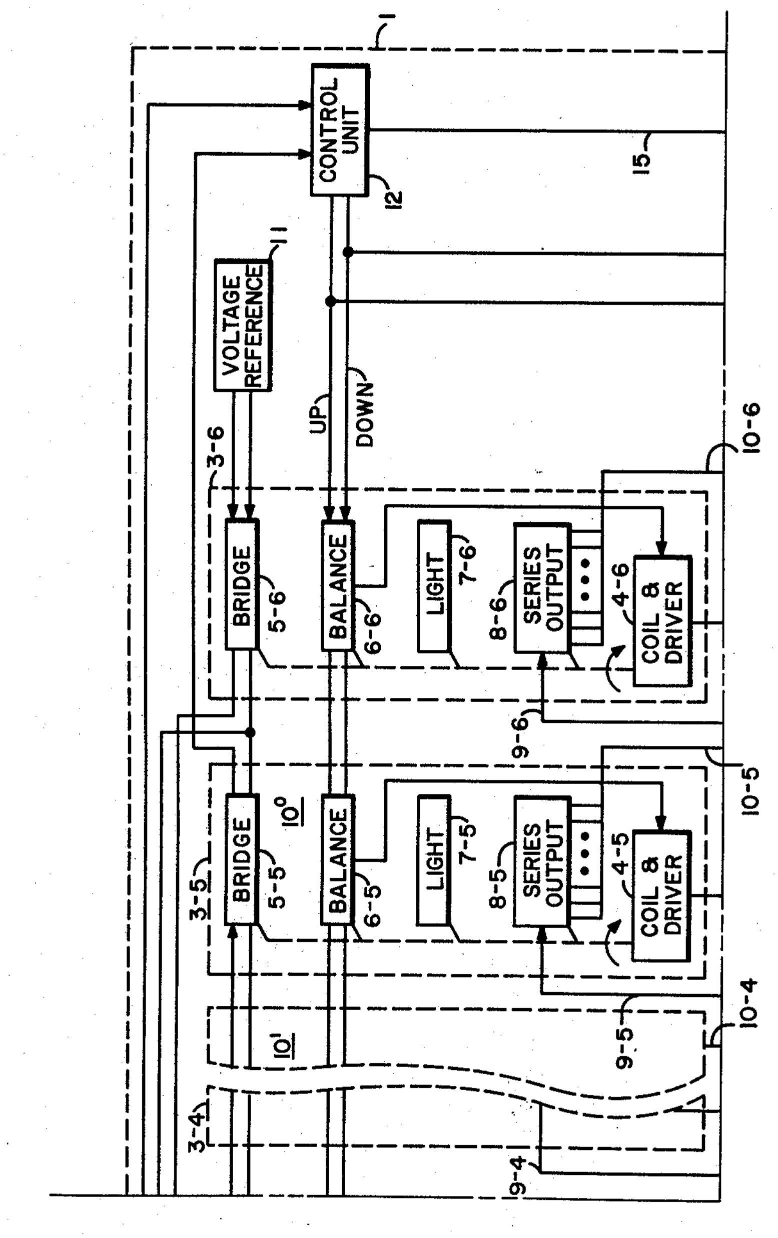
Figure 2:
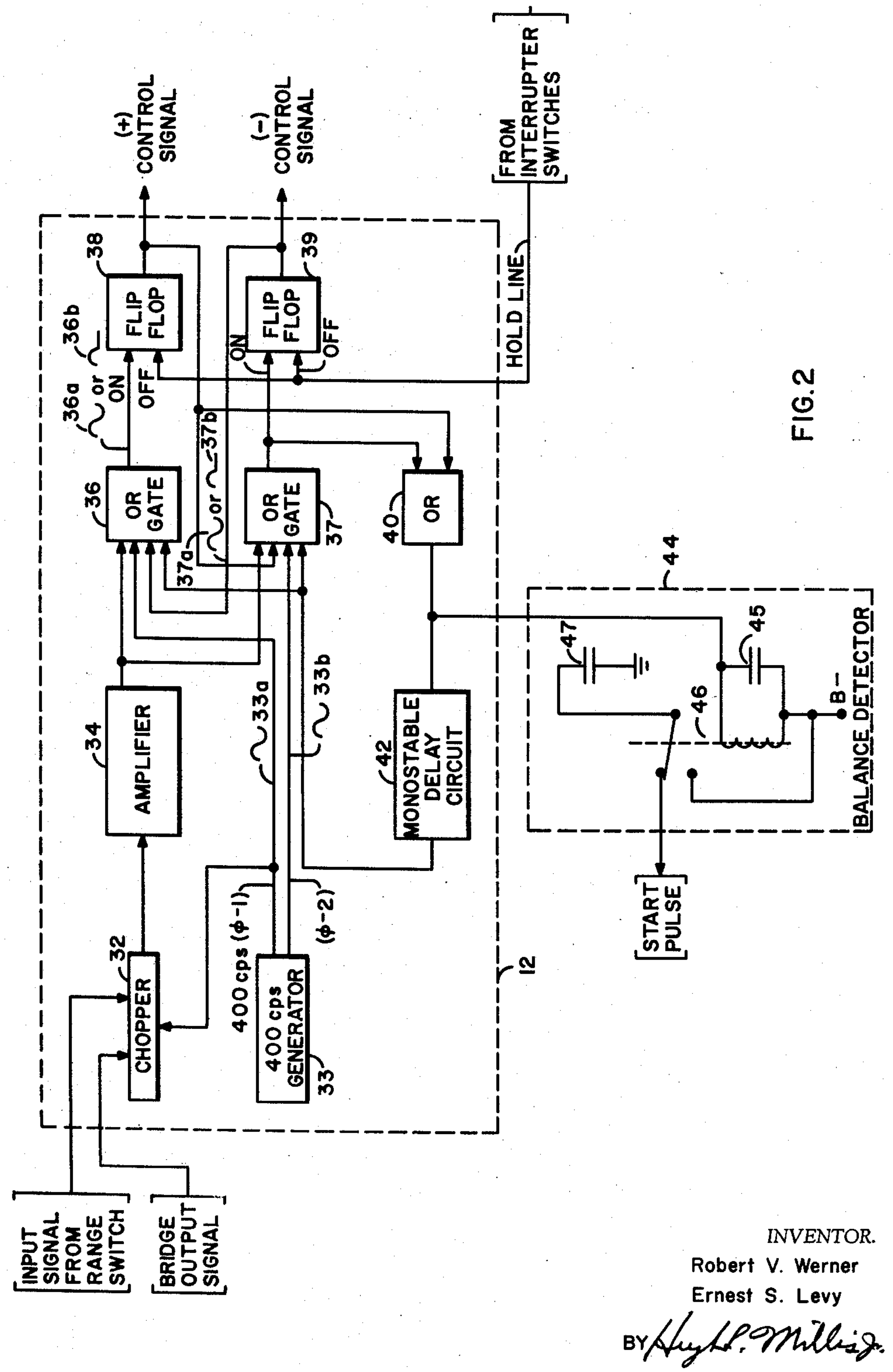
Figure 3:
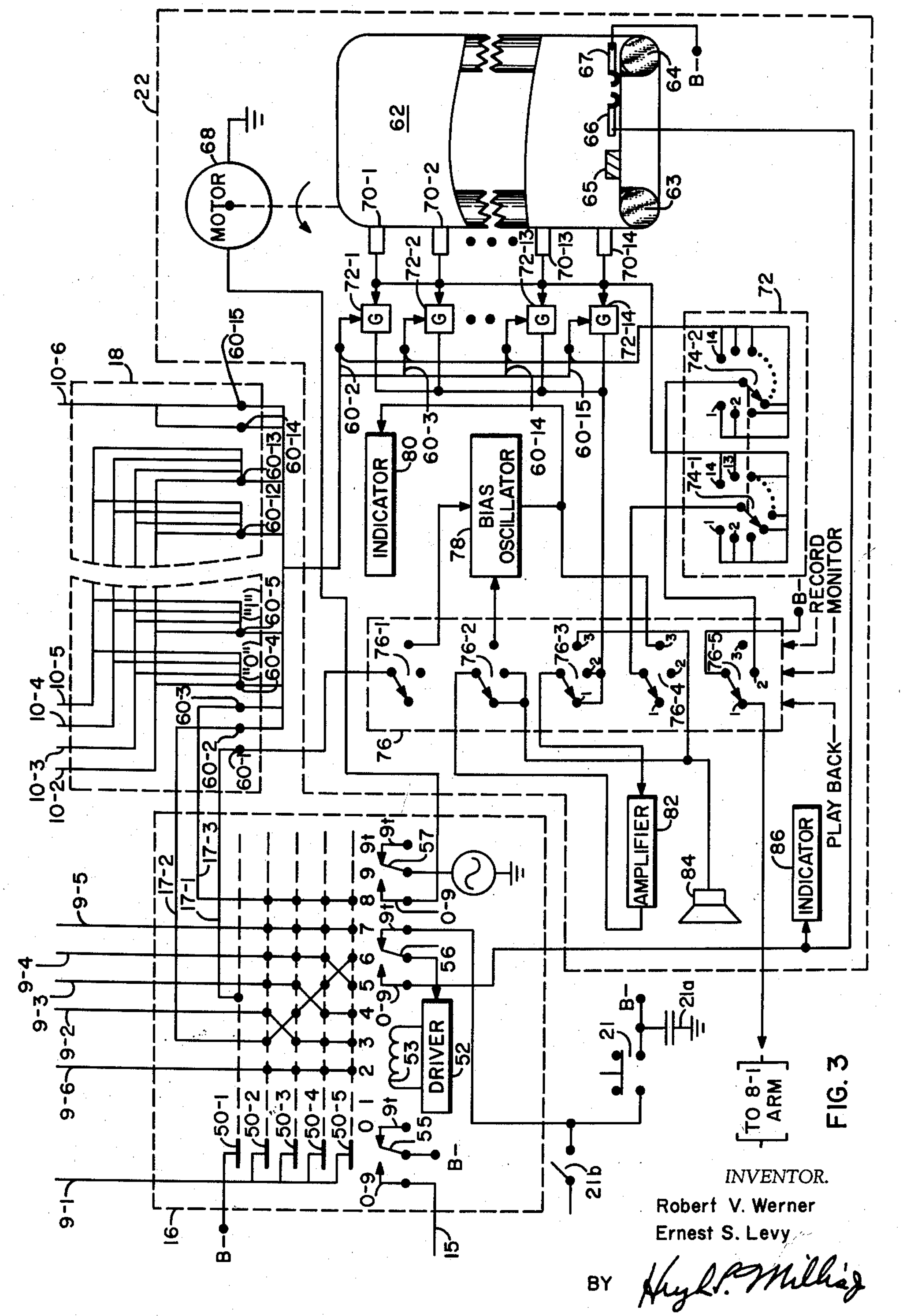

Other objects, features and attendant advantages of the present invention will become more apparent to those skilled in the art as the following disclosure is set forth including a detailed description of a preferred embodiment of the invention as illustrated in the accompanying sheets of drawings in which:

FIGURES 1*a* and 1*b*, hereafter referred to as FIGURE 1 are a block diagrammatic representation of a self-balancing digital voltmeter in conjunction with the audio readout unit of the present invention;

FIGURE 2 is a block diagrammatic representation of the control unit and balance detector of the digital voltmeter; and FIGURE 3 is a block schematic diagram of the audio readout unit of the present invention.

Referring now to the drawings, wherein the same elements are given identical numerical designations throughout the several figures, there is illustrated in FIGURE 1 the basic digital voltmeter and audio readout system according to the present invention. The digital voltmeter unit is shown within dotted block 1, while the audio readout unit, connected to the voltmeter, is shown in block schematic form in dotted block.

Voltmeter 1 includes a series of six similar stepping switches, indicated schematically at 3–1, 3–2 on through 3–6. Switches 3–1 and 3–6 serve to register or indicate the range and polarity, respectively, of the voltmeter readings. The remaining switches 3–2, 3–3, 3–4 and 3–5 indicate respective $10^3$ or thousands, $10^2$ or hundreds, $10^1$ or tens, $10^0$ or units, digits of the value of an applied input D.C. voltage. Each stepping switch may be similar to the Type 84 switch manufactured by the Automatic Electric Corporation, as is illustrated in electrical circuit form in the following FIGURE 3. Stepping switch 3–1, taken by way of example, includes a coil and driver unit 4–1 which serves, when energized, to incrementally drive a shaft which is coupled to switch arms in four respective levels, designated as "bridge," "balance," "light," and "series output." Each switch level includes eleven switch contacts, one for each decimal digit and an extra contact, *9t*, electrically connected to the decimal "nine" digit, which is required for the balance operation. The bridge and balance levels of the six stepping switches provide the stepping logic and voltage matching functions of the voltmeter, while the light and series output levels serve to provide two respective different types of readout indication.

Considering the interconnections between the bridge and balance levels of the various circuits, the input voltage is applied across the bridge level 5–1 of the range switch and the signal appearing on bridge level switch arm, not specifically shown, is applied to one input terminal of a control unit 12. The output potential of a voltage reference source 10 is connected to the bridge level 5–6 within polarity switch 3–6, and the output attenuated signal from bridge level 5–6 is applied to the bridge level 5–2 in the $10^3$ switch 3–2. The remaining bridge levels are serially interconnected, with the bridge's output signal being taken from the unit's bridge level and applied to the other input terminal of control unit 12.

Control unit 12 produces control signals on a pair of output terminals, respectively designated Up and Down, which, in turn, are connected to the balance switch level 6–6 of the polarity stepping switch 3–6. The balance switch levels are interconnected serially, as shown, and an output drive conductor is coupled between each balance switch level and the coil and driver unit of its associated stepping switch. One of the off-normal contacts, or interrupter circuits, of all of the stepping switches, not herein being specifically illustrated, shown coming from the coil and driver units, are connected in parallel, in the manner shown for off-normal contact switch 55 in FIGURE 3, and their common conductor is connected to a "hold" input terminal of control unit 12.

The movable switch arm of level 8–1 of switch 3–1 is connected to a conductor coming from scanning stepping switch 16 in the audio readout unit and will, as later explained, furnish a B— potential for certain operational cycles, as needed for driving various transistor circuitry. Adjacent switch contacts of this switch 3–1 are connected to four input terminals of the audio readout scanning switch 16 in a manner shown later. Scanning switch 16, in turn, has separate output leads connected to the movable switch arm in the series output switch levels 8–2, etc., through 8–6 in the associated stepping switches. The switch contacts in each of the series output switch levels of the $10^3$ through the $10^0$ stepping switches are connected to a selector unit 18 within readout unit 2, and shown later detailed in FIGURE 3. In the same way, two output leads from series output level 8–6 of the polarity switch are connected to selector unit 18.

The Up and Down output conductors from control unit 12 are coupled to a balance detector 20 within readout unit 2, whose output signal, in turn, is applied through a switch 21*b* to scanning switch 16. A pushbutton 21 is connected between the common junction between a capacitor 21*a* and the B— terminal of a source of negative potential, not shown, and the output conductor of detector 20 as it is connected to scanning switch 16.

The "hold" output line from voltmeter unit 1 is also connected to scanning switch 16. The audio readout unit 2 includes, as previously noted, scanning switch 16 and selector unit 18. Both switch 16 and selector unit 18 are interconnected with a record and playback unit 22, and additional details of these three units and their interconnections are shown later in FIGURE 3.

The detailed construction and operation of digital voltmeters, such as unit 1, are well known in the art as a number of varieties of such voltmeters have been commercially available for several years and are now widely disseminated throughout the electronics industry. One such commercially-available voltmeter is represented by Cubic Corporation Models V–41 and V–51, operated in conjunction with the Cubic Model C–1 control unit. Other firms have manufactured substantially similar units, and the basic construction and operation of all of these units are substantially identical. As will also be appreciated, operating and instruction manuals of such instruments are widely dispersed and are also readily available.

By way of brief summary of the digital voltmeter's operation, a constant, highly-stable voltage reference signal is compared against an input signal. The polarity switch serves to switch the proper terminals of the reference signal into the bridge circuitry so that its polarity corresponds to that of the unknown or input signal. The range switch bridge 5–1 is employed for attenuating the input signal until its magnitude is roughly comparable to the reference signal, and the reference voltage is then incrementally attenuated by the stepping bridge arrangement until the range modified input signal and the bridge attenuated reference signal are equal in magnitude, at which time the position of the contacts of the stepping switches represents the input signal magnitude.

In particular, the voltmeter includes a series of interconnected bridge elements, a series of interconnected balance circuits, and a control unit or voltage comparator unit 12. The bridge units are connected to form a Thompson-Varley bridge, and, considering bridge 5–2 in the "thousands" or $10^3$ switch circuit, for example, each step made by stepping switch 3–2 will act to decrease the output signal of bridge 5–2 one-tenth of its full-scale value. The decrease caused by this single step, in turn, will equal 10 steps, or the complete range made by the bridge level in the next lower or $10^2$ digit switch 3–3. Thus, the attenuations produced by bridges 5–2 through 5–5 on the reference voltage, as applied to control unit 12, are successively scaled in powers of ten. Also, each activation of a coil and driver unit will serve to lower the voltage through its associated bridge circuit one-tenth of its full-scale value.

Control unit 12 acts, in the absence of a "hold" signal on the designated "hold" input line, to compare the relative magnitudes of the range-switch-attenuated input signal with the bridge-attenuated voltage reference 10 signal. If the bridge signal magnitude is the lower of the two, an output pulse is produced on the Up output conductor, and this signal, in turn, is conducted into the serially-connected group of baalnce switch levels. These balance levels provide a plurality of signal path connections between the Up and Down input conductors and the various coil and driver units. These path connections are such that, for any given combination of stepping switch positions, input Up or Down signals will be applied to only one coil and driver unit, which then activates its associated switch in a proper direction to ultimately establish null. The stepping logic of the voltmeter is accordingly contained in these balance switch interconnections, and, as will be appreciated, a number of different types of specific balance circuit connections are possible, based on receipt of Up and Down input signals, for driving all stepping switches to a final null position. As will also be understood, the particular set of connections employed is of no specific pertinence to the present invention, since, as will become clear later, all audio readout cycles are taken only when all switches are at balance or are held stationary by a "hold" signal applied to control unit 12, which, in turn, acts to prevent the production of any additional Up and Down output pulses by unit 12.

A visual readout of the voltmeter reading is obtained through the designated series of light switch levels, 7–1 through 7–6, by connecting a light and appropriate illuminable readout symbol to each different contact of each of these levels. For example, light unit 7–2 of switch 3–2 may have ten individual lights connected to its ten contact points, corresponding to the digits 0 through 9. Then, in an output display unit, the lights may be positioned under separate Lucite plates, for example, having 0 through 9 digits engraved on them, respectively. Then, the particular light corresponding to the switch position of coil and driver unit 4–2 will be energized and the associated Lucite digit illuminated for readout display purposes.

The range light 7–1 will energize one of four lights and related visual decimal points which are positioned between the four rows of display digits corresponding to the 3–2 through the 3–5 switches. In the same way, the light unit 7–6 of the polarity switch 3–6 will have two basic connections going to lamps positioned beneath "plus" and "minus" readout Lucite plates. Thus, regardless of the state of the switch units, a continuous visual readout will be presented, based on the positions of the various stepping switch arms.

Referring now to FIGURE 2, there is illustrated in detail control unit 12 and balance detector 20, previously shown in block diagram form in FIGURE 1. The input signal from the range switch bridge level 5–1 in FIGURE 1 is applied to one input terminal of a chopper 32, while the output signal from the bridge units in FIGURE 1 is applied to the other input terminal of this chopper. The designated $\phi$–1 signal, representing one phase of a push-pull output A.C. signal produced by a 400-c.p.s. generator 33, is applied to the vibrator input terminal of chopper 32. The output signal from the chopper is amplified by an amplifier 34 and applied to one input terminal of each of a pair of four terminal "or" gate circuits 36 and 37. The output signal from "or" gate 36 is applied to the "on" input terminal of a flip-flop 38, while the output signal from "or" gate 37 is applied to the "on" input terminal of another flip-flop 39. The "on" output terminals of flip-flops 38 and 39 are coupled to other input terminals of "or" gates 37 and 36, respectively. The "hold" conductor, connected in parallel to the interrupter contacts of the voltmeter stepping switches, is coupled to the "off" input terminals of flip-flops 38 and 39. The output terminals of the two flip-flops are also connected to the two input terminals of another "or" gate 40, whose output signal is applied both to a monostable delay circuit 42 and to the balance detector 44, in a manner to be described shortly. The output signal of monostable circuit 42 is connected to another input terminal of each of "or" gates 36 and 37. The $\phi$–1 output signal of generator 33 is applied to the final input terminal of "or" gate 36, while the other, or $\phi$–2 output 400-c.p.s. signal from generator 33, exactly 180 degrees out of phase with the $\phi$–1 signal, is applied to the final input terminal of "or" gate 37.

The "or" circuit 40 output signal is applied to one end of the relay coil of a relay 46 within balance detector 44. A capacitor 45 is shunted across the relay coil, and the other end of the relay coil is connected to the B— terminal of a source of negative potential, not specifically shown. The movable arm of relay 46 is connected to one plate of a capacitor 47 whose other plate is connected to ground. The upper contact point of the relay is connected to the balance detector output conductor, shown previously in FIGURE 1, while the lower contact point of the relay is connected to the B— terminal.

In operation, the 400-cycle signal from generator 33 synchronously drives chopper 32 in conventional fashion such that the bridge and input signals are alternately applied to its output conductor during alternate half-cycle intervals marked by the driving 400-c.p.s. signal. Accordingly, a 400-cycle output signal is produced whose alternate half-cycles correspond to the respective input and bridge signals. Amplifier 34, including a 400-cycle tuned circuit, amplifies the chopper 32 signal, and the phase of its 400-cycle output signal will be determined by the relative magnitudes of the two input signals. In essence, "or" circuits 36 and 37 serve as phase detectors and trigger their associated flip-flop "on" in accordance with particular phases of the amplifier 34 signal. Assume, for example, that initially both flip-flops are "off" and that the input signal is larger than the bridge signal, in turn, denoting that a positive or (+) control output signal should be produced by this control unit. Under this condition, the chopper and amplifier output signal will be in phase with the $\phi$–1 400-cycle signal, whose waveform is indicated at 33*a*. Since flip-flop 39 and monostable delay circuit 42 will both be at their "off" states, as assumed, their two respective input signals applied to "or" gate 36 will be at a relatively low voltage level. Accordingly, the amplifier 34 and waveform 33*a* signals, being in phase, will be passed by "or" gate 36, as shown by waveform 36*a*. The negative-going final half cycle of this waveform 36*a* signal acts to trigger flip-flop 38 to its "on" state. This, in turn, will pass a control signal out over the output (+) line to the balance circuits of FIGURE 1, after amplification by an amplifier, not specifically illustrated. This signal will be passed through the various balance circuits and eventually be applied to one of the coil and driver units within the six stepping switches, as noted earlier.

In accordance with the detailed operation of the preferred type of stepping switch, as specified earlier, a coil in the stepping switch will be energized and the resulting armature movement employed to compress one end of a spring whose other end is connected to the stepping arm. The armature, after moving a predetermined amount, contacts an interrupter switch arm which then closes and applies a signal of negative polarity to the "hold" line. This signal turns flip-flop 38 to its "off" state with the particular coil driven by the original (+) signal being de-energized and the compressed spring acting to pull or rotate the brush assembly, representing the various movable contact arms of the stepping switch, one step.

As will also be noted, the flip-flop 38 "on" signal will prevent the output signal of gate 37 from going to its low voltage level, as would happen upon a reversal of input signal magnitudes. This, in turn, prevents flip-flop 39 from being triggered "on" whenever flip-flop 38 is "on."

Whenever flip-flop 38 is triggered by the "hold" line signal to its "off" condition, a triggering signal is applied from its "on" output terminal through "or" circuit 40 to trigger monostable delay circuit 42 to its "on" state. Its resulting relatively high voltage output signal level, applied o each of "or" circuits 36 and 37, acts to inhibit any passage of a negative half-cycle signal from the combination of amplifier 34 and generator 33 signals. Accordingly, both of flip-flops 38 and 39 are inhibited from being triggered "on" during the time the actual switching operation is taking place in the stepping switches. In this way, all transients, etc., produced in the bridge circuitry by the switching action are blocked from flip-flops 38 and 39. Delay circuit 42 is preferably adjusted such that its "on" time is sufficient to enable all of the switching transients to completely die out in the bridge before going to its "off" condition.

The operation of the "or" circuit 37 and flip-flop 39 combination is identical to the operation just described for gate 36 and flip-flop 38, except that the $\phi$–2 signal 33*b* from generator 33 is applied to gate 37, and this signal, in turn, will be in phase with the amplifier 34 output signal whenever the bridge output signal is greater than the input signal. Whenever this condition exists and both flip-flop 38 and monostable 42 are at their "off" conditions, a negative half-cycle signal, as in wave-form 37*a*, will be passed to the flip-flop 39 "on" input terminal, with its subsequent triggering and production of an output (—) control signal.

Balance detector 44 produces an output signal whenever the bridge circuitry is at balance, that is, the input and bridge output signals are substantially identical in magnitude and the reading produced by the voltmeter represents the value of the input signal. During intervals that an unbalance condition occurs, a series of signals will appear from the control unit on the output terminal of "or" gate 40, in turn, coming from the triggerings of flip-flops 38 and 39. These signals will build up as a charge across capacitor 45, energize the relay coil of relay 46, and activate the movable arm of relay 46 to its "down" position. During this relay condition, capacitor 47 will be charged by the B— terminal potential. Then, whenever balance occurs, and no additional signals are applied to capacitor 45 from the control unit, its charge will leak off through the relay coil and the relay arm will be released to its "up" position. In contacting the upper switch contact, the charge previously stored across capacitor 47 will appear on the output line from the balance detector as an output pulse to indicate the balance condition and, as will be later explained, is employed to activate an audio readout cycle of operation.

Referring now to FIGURE 3, there is illustrated audio readout unit 2, in detailed form, as previously shown in FIGURE 1. Scanning switch 16 includes five brushes, numbered 50–1 through 50–5, which are driven incrementally by energization of a coil 53 to make successive contact with a series of switch contacts. Each switch level has eleven contacts, corresponding to the decimal digits 0 through 9, and a final contact 9*t*, following contact number 9. For the purposes of clarity, the brushes are indicated to the left of their corresponding switch levels, but will, in practice, always be engaged with one particular contact column. Brush 50–1 is connected to the B— terminal of a source of negative potential, not specifically illustrated. The remaining brushes, 50–2, 50–3, 50–4 and 50–5, are connected to contact 9*t*, contacts 0, 1, 8 and 9, contacts 2, 3, 6 and 7, and contacts 4 and 5, respectively, of switch level 8–1 in the range stepping switch 3–1, as shown earlier in FIGURE 1. These respective brush connections correspond to the $10^{\circ}$ or unit digit, $10^1$ or tens digit, $10^2$ or hundreds digit, or $10^2$ or thousands digit, respectively, in accordance with the range of input voltage values capable of being read by the digital voltmeter. The connections made from the switch 16 brushes to the particular switch contacts within range switch level 8–1 are, of course, a function of the specific balance and bridge level connections of the range switch, and these may take many different forms as determined by the particular voltmeter balance logic employed in the voltmeter unit.

The switch contacts of the "2" column, corresponding to brushes 50–2 through 50–5, are connected together to conductor 9–6, which, in FIGURE 1, is connected to the movable switch arm of the series output switch level 8–6 of the polarity stepping switch 3–6. The output conductor 17–2, previously shown in FIGURE 1 as connected between scanning switch 16 and selector unit 18, is connected to the "3" switch column of the brush 50–2 level, the digit "4" contact of the brush 50–3 level, the digit "5" contact of the brush 50–4 level and the digit "6" contact of the brush 50–5 level. Next, conductor 9–2, connected to the movable switch arm of the series output level 8–2 in the $10^3$ stepping switch 3–2 of FIGURE 1, is connected to the "4" contact of the brush 50–2 level, and then to the "3" contacts of the brush 50–3 through the brush 50–5 switch levels. Conductor 9–3, connected to the movable switch arm of the series output level of the $10^2$ stepping switch 3–3 in FIGURE 1, is connected to the "5" contacts of the brush 50–2 and 50–3 levels, and then to the digit "4" contacts of the brush 50–4 and 50–5 levels. The conductor 9–4, connected to the movable arm of the series output switch level in the $10^1$ stepping switch 3–4 in FIGURE 1, is connected to the "6" contacts of the brush 50–2 through 50–4 levels and finally to the "5" contact of the brush 50–5 level. Output conductor 9–5, connected to the switch arm of series output level 8–5 of stepping switch 3–5, representing the units or $10^0$ voltage digit, is connected to the "7" contacts of the brush 50–2 through 50–5 switch levels. In the same way, the "8" contacts of the brush 50–2 through 50–5 levels are connected together to form output conductor 17–3, earlier shown in FIGURE 1. Finally, conductor 17–1 is connected to the "5" switch contact of the first brush 50–1 level.

Switch 16 may be similar to the voltmeter stepping switches, as previously described. Such stepping switches have three, as termed, off-normal contacts, as shown at 55, 56 and 57. The contact arms of each of these two-position switches are actuated by a lobe positioned on a wheel attached to the wiper assembly, in turn holding the noted brushes and driven by coil 53. The lobe is so arranged that when the brushes are engaged with the 9*t* contact, the switch arms will be engaged by the lobe and thrown thereby to make the, as illustrated, right-hand contact. During all other brush positions, that is, from the 0 through the 9 digit contact positions, the movable arms of these off-normal contacts will not be engaged by the lobe and will rest at their normal or left-hand position.

Considering the connections made to these off-normal contacts, the movable switch arm of contact 55 is connected to the B— terminal of a source of negative potential, not shown. The left-hand or 0–9 contact is connected to "hold" line 15, earlier shown in FIGURE 1. It should be again noted, at this point, that "hold" line 15 is connected to interrupter contacts, not here illustrated, in the voltmeter stepping switches, and serves, when closed, to stop or halt their respective stepping switch actuation by turning off either of flip-flops 38 or 39, in FIGURE 2. Accordingly, whenever any of the switches are positioned between the 0 and 9 contacts, a B— signal will be applied to the hold line and will serve to maintain flip-flops 38 and 39 in their "off" state and hence prevent any (+) or (—) control signals from being produced by the voltage comparator circuit.

The movable arm of off-normal contact 56 is connected to the input or driving terminal of driver 52 and serves to apply input signals to the driver circuit, when energized, to thereby order an actuation of the stepping switch. The 0–9 contact of switch 56 is connected to a conductive spring clip 66, associated with an endless magnetic tape loop 62, both of which will be described in more detail later. The 9*t* contact of switch 56 represents the "on" terminal of the scanning switch unit and is connected to the balance detector output conductor and pushbutton 21, previously shown in FIGURE 1. Finally, the movable arm of switch 57 is connected to a source of A.C. power, while its 0–9 contact is connected to one end of the winding, not shown, of a motor 68, driving the tape unit mechanism to be described later.

Selector unit 18 includes a series of fixed junction points numbered 60–1 through 60–15, not all being herein indicated in detail. Contact points 60–1, 60–2 and 60–3 are connected to conductors 17–1, 17–2 and 17–3, respectively, coming from scanning switch 16. As will be recalled, each of the series output levels in switches 3–2 through 3–5 of FIGURE 1, have their 0 through 9 contacts connected to separate output leads, the final 9*t* contact being connected to 9, as noted, with the respective bundles being then coupled to selector unit 18. In particular, the junction points 60–4 through 60–13 correspond to the 0 through 9 contact points in each of these switches, and the specific conductors coming from the 0 numbered contact in each of the series output levels are connected together at the 60–4 junction point, while the conductors coming from the "1" digit contacts in the four series output switch levels are connected together at the 60–5 junction points, etc. Thus, the corresponding digit contact points in the four series output levels of the four voltage stepping switches are connected in parallel to each other in this selector unit 18. Finally, the two output leads, representing + and —, coming from series output level 8–6 in the polarity stepping switch 3–6 are connected to the two remaining junction points 60–14 and 60–15.

The record and playback unit 22 includes an endless magnetic tape loop 62 wrapped around a pair of spaced rollers 63 and 64. Roller 63 is driven by motor 68 and serves to move tape 62 past a series of magnetic record-playback heads 70–1, 70–2, on through 70–14, only the first and last pair being specifically illustrated. The coils within the series of heads 70–1 through 70–14 are connected to one input terminal of a series of gating circuits 72–1 through 72–14, respectively, only the first and last pair being specifically illustrated. The other input terminals of the series of gating circuits 72–1 through 72–14 are connected to the series of common junction points 60–2 through 60–14, respectively, within selector unit 18.

This record-playback unit 22 includes a 14-contact-position, 2-level switch 74 and a 3-contact-position, 5-level switch, indicated at 76, both switches being manually operable for selecting the operational mode of the audio readout unit. In particular, the contact points designated 1 through 14 of the first level 74–1 of switch 74 are connected to the coils of the series of record-playback heads 70–1 through 70–14, respectively. In the same way, the series of contact points numbered 1 through 14 of the second level 74–2 of switch 74 are connected to the series of leads 60–2 through 60–15, respectively, as they are connected, as previously described, to the input terminals of the series of gating circuits 72–1 through 72–14, respectively. The movable switch arm of switch level 74–1 is connected to the movable switch arm of the fourth level 76–4 of switch 76, while the movable switch arm of the second level 74–2 is connected to the second contact position of the fifth switch level 76–5 of switch 76. All output terminals of the series of gating circuits 72–1 through 72–14 are connected to a common terminal and from there to the first and second switch contacts of the third switch level 76–3 of switch 76.

Considering now the remaining connections to switch 76, common junction point 60–1 within selector unit 18 is connected to the movable switch arm of switch level 76–1, and the only connection taken from the switch points in this first level is from the third contact position to one input terminal of a bias oscillator circuit 78. The other input terminal to bias oscillator 78 is taken from the third switch point of the second switch level 76–2. The output terminal of an amplifier 82 is connected to the movable switch arm of this second switch level 76–2, while the first and second switch points to this 76–2 level are connected to a transducer or combination loudspeaker-microphone unit 84.

The movable switch arm of the third switch level 76–3 is connected to the input terminal of amplifier 82, while the third fixed switch position of this third level is connected to loudspeaker-microphone 84. The output signal of bias oscillator 78 is applied to the third fixed switch point of switch level 76–4, while the second fixed contact of level 76–4 is connected to the B− terminal of a source of negative potential, not specifically illustrated. The movable switch arm of the final switch level 76–5 is also connected to the noted B− terminal, while its first switch point is connected to the series output movable switch arm of switch level 8–1, previously shown in the range stepping switch 3–1 of FIGURE 1.

Another spring clip 67, similar to 66 but connected to the B− terminal, is positioned to contact the lower edge of tape 62. A metallic strip, whose length slightly exceeds the distance between the tape-contact spacings between clips 66 and 67, is affixed to the lower edge of tape 62 and serves, upon tape movement, to produce a shorting contact between clips 66 and 67. Finally, an indicator unit 80 is connected to the output terminal of bias oscillator 78 and another indicator unit 86 is coupled to the clip 66 output conductor.

The audio readout unit of the present invention has three manually-selected modes of operation—record, monitor and playback. In essence, the record operation enables the operator to record appropriate verbal or descriptive words along the various tape 62 channels, corresponding to the 14 record-playback heads 70–1 through 70–14. The monitor operation then enables the operator to assess the quality of each recorded track as to volume, noise, quality, start and stop times, etc. Finally, the most general mode, the playback one, enables either an automatic or a manually-ordered audio readout of the digital voltmeter voltage reading of the input variable to be made.

The 14 tracks along tape 62 must correspond to the recorded words "plus," "minus," "zero," "one," "two," on through "nine," "point" and "volts," since this inclusive group, as will be appreciated, is required to give a complete audio reading of the voltmeter output. In particular, in tracing through the circuit connections, head 70–1 corresponds to the word "point," head 70–2 corresponds to the word "volts," heads 70–3 through 70–13 correspond to the words "zero" through "nine," respectively, while heads 70–14 and 70–15 correspond to "plus," and "minus," respectively. The relationships between the specific heads and their corresponding readings, is, of course, determined by the specific connections made to the gating circuits associated with the heads from the selector unit. The particular association shown and described is, of course, strictly arbitrary and a matter of engineering choice.

As pointed out earlier, the series of 14 contacts on each switch 74 level corresponds to the respective series of 14 heads, and the switch 74 movable switch arm position acts to choose a particular head for the record operation. Considering now in detail this recording function, assume that switch 74 is thrown to the desired track or channel to be recorded and that switch 76 is also thrown to its third or right-hand contact position, which corresponds to this record operation, as noted earlier. The brushes in scanning switch 16 will be positioned on the **9*t* contact switch position, which is the rest, or normally inoperative, position of the switch. Accordingly, owing to the 9*t* contact position of off-normal contact 57, motor 68 will be de-energized and no movement afforded tape 62. At the same time, the input terminal of driver 52 will be connected to pushbutton 21**.

To initiate the record cycle, pushbutton 21 is depressed, with the result that the charge previously built up on capacitor **21*a* is routed through off-normal contact 56 to driver 52, with the result that driving coil 53 will be energized and the switch 16 brushes activated or advanced one contact position, that is, from their 9*t* to 0 switch position. Upon this occurrence, all off-normal contacts will be released from their 9*t* position and moved to the left-hand or 0–9 contact position. Accordingly, motor 68 will be energized from off-normal contact switch 57 to drive tape 62. Upon movement of tape 62, whenever clips 66 and 67 are shorted by tab 65, the B− terminal potential will be applied through off-normal contact switch 56 to driver 52 and thereby order another step made by stepping switch 16**.

This operation will continue with the result that the switch 16 brushes will be stepped to their next higher numbered contact position, at the end of each revolution of tape 62, and the brushes will remain stationary at each contact switch position for one revolution of tape 62. It will also be noted that indicator 86, comprising, for example, a neon light, will produce a single, short, visual indication upon each single turn of tape 62. Now, whenever the brushes, in being driven incrementally by the tape movement, contact the fifth contact column, conductor 17–1 will be energized by the B− potential normally applied to brush 50–1, and this B− potential will be applied through switch level 76–1 of switch 76 to one input terminal of bias oscillator 78 to thereby activate oscillator 78. This B− signal, it should be noted, may be applied as the normal power supply potential to a transistor oscillator constituting oscillator 78, with its resulting operation. Owing to the switch position of switch 76, transducer 84, serving in this record operation as a microphone, will be connected through switch level 76–3 to the input terminal of amplifier 82, while the output signal from amplifier 82 is applied through switch level 76–2 to the other input terminal of oscillator 78. The output signal of oscillator 78, constituting a carrier signal of 50 kc., for example, and amplitude modulated by the transducer 84 signal, will then be routed through switch level 76–4 to the movable arm of switch level 74–1 of switch 74 and from there to the particular head selected by the position of this switch 74 movable arm.

Now, during the time that bias oscillator 78 is on, corresponding to one single turn of tape loop 62, in turn, corresponding to the switch 16 brush contact time made with the contact column designated "5," indicator 80, comprising, for example, a neon light, will be "on," to thereby signify to the operator that he is, during that time, to speak the particular word desired to be recorded on the selected channel. Following this recording cycle, clip 66 again energizes driver 52 after the completion of the tape turn, as the stepping operation continues, as described. Finally, when the **9*t* position is reached by the brushes, the off-normal contact switches will be moved to their right-hand position and the normal idle condition reestablished, with motor 68** being de-energized.

The monitor operation is performed by switching switch 76 to its second or middle contact position, corresponding, as previously noted, to the monitor operation. For this switch position, the input of amplifier 82 is connected to the common output connection of the series of gating circuits, and the output signal of amplifier 82 is applied to loudspeaker 84. The B− signal will be applied from switch level 76–5 through the movable switch arm of switch level 74–2 of switch 74 to the gating circuit associated with the head selected by the position of switch 74.

To initiate the monitor operation, pushbutton 21 is again depressed, with the result that a complete stepping cycle of operation, as described for the record operation, will be initiated. The B− signal, applied through the second level of switch 74, opens the particular gate selected by the switch 74 position, and the signal read by its associated head will be passed through that gate only to the common line, through amplifier 82 to loudspeaker 84. Here, the recorded signal on the selected channel will be continuously played back, once each tape turn, because of the direct connection made to the amplifier. During this operation, switch 74 may be switched from position to position to thereby acquire audio readouts of various channels during the consecutive turns made by tape 62 in accordance with the stepping switch 16 operation. By this switching of switch 74 during the monitor cycle, it is possible to gain an immediate comparison between the signal levels, qualities, etc., of adjacent recordings.

The playback operation is achieved by positioning switch 76 at its first contact or left-hand position. In this switch position, the B— terminal potential is applied through switch level 76–5 to the movable switch arm of the series output level 8–1 in the range switch 3–1, with the result that one of the four brushes 50–2 through 50–5 in scanning switch 16 will be energized, as determined by the particular position of the range stepping switch in the voltmeter. A readout cycle may be initiated in one of two ways. If switch 21*b* is closed, then the readout cycle will be started whenever balance detector 20 produces a start pulse on its output line going to the scanning switch, in turn, produced whenever a balance condition is attained in the voltmeter unit, as described earlier in connection with FIGURE 2. Alternately, a readout cycle may be initiated by manual depression of pushbutton 21. Either technique will produce a pulse serving to energize driver 52 through off-normal contact switch 56, with the ensuing stepping of the brushes from the 9*t* to 0 position, as described earlier in connection with the record and monitor operations.

After driver 52 has been energized once, the B— terminal potential will be applied by off-normal contact switch 55 to "hold" line 15, and this, in turn, will prevent control unit 12 in FIGURE 1 from producing any additional (+) or (−) signals to the balance circuitry in the voltmeter portion. Accordingly, its then existing voltmeter reading will be maintained without further change during the time required for performing this audio readout cycle.

As earlier described, once the stepping is started, it will proceed automatically by the series of spring clip 66 signals, produced during successive turns of tape 62. As noted above, only one of the brushes coming from the range stepping switch will be energized, and since all of the switch 16 contact levels are connected together at their contact 2 positions, line 9–6 will be energized when stepping switch 16 steps to its number 2 position. Now, as will be recalled, conductor 9–6 is connected to the series output switch level of the polarity stepping switch in the voltmeter unit, and a signal will appear on one of junction points 60–14 or 60–15 in accordance with the particular polarity of the voltage then being read by the voltmeter. The particularly energized junction point opens its associated gate, either 72–13 or 72–14, and the signal picked up by the corresponding head will, for the next following turn of tape 62, be passed through the gate to the common output gate line. From there, the signal will be amplified by amplifier 82 and an audio readout obtained from loudspeaker 84.

After this readout, stepping switch 16 will be actuated to its next position. If brush 50–2 is energized, corresponding to the lowest range reading, then conductor 17–2 will be energized and gate 72–1 opened, with the ensuing readout of the word "point," which represents the decimal point in the voltage reading. On the other hand, if the voltage being read is in another range, then one of brushes 50–3 through 50–5 will be energized in accordance with the range switch position, and the signal from the energized brush applied to conductor 9–2. This conductor, as will be recalled, is connected to the movable switch arm of the series output level 8–2 of the highest significant digit or $10^3$ stepping switch 3–2. This signal is then applied to the particular junction point of the junction points 60–4 through 60–13, corresponding to the particular output conductor contacted by the movable switch arm of output level 8–2. The junction point so energized opens its associated gate and the signal picked up by its associated head is applied through amplifier 82 to loudspeaker 84 for the next audio output reading.

The process just described is repeated for successive stepping cycles of switch 16, the word "point" being injected in proper relationship to the other digits read out as based on the particular brush energized in the range switch. The final readout is produced in the number 8 contact column of switch 16, in which conductor 17–3, connected to common junction 60–3, is energized by the energized brush. This signal, in turn, opens gate 72–2, corresponding to head 70–2, and the word "volts" will then be read out by loudspeaker 84. After one blank step, the 9*t* position will be reached with an automatic shut-off, as described earlier. At shut-off, motor 68 is deenergized, the B— signal withheld by off-normal contact 55 from "hold" line 15, with normal operation of the voltmeter then proceeding.

As will be appreciated by those skilled in the art, the audio readout unit, according to the present invention, may be altered in numerous particulars without involving invention. For example, a separate loudspeaker and microphone could be employed instead of the single transducer, serving both functions, as described. The modifications required in the switching connections for employing the separate microphone and loudspeaker arrangement will be obvious to those skilled in the art.

Although the audio readout device, according to the present invention, is described for connection to digital voltmeters, it is quite obvious that it may be employed with digital voltmeters connected to serve other uses, that is to measure ohms, current, or voltage ratios, which are designated as digital ohmmeters, digital ammeters and digital ratiometers, respectively. These other applications of digital voltmeters, that is, their use in measuring these other quantities, are provided, as will be appreciated, by suitable input devices which effectively convert the quantity of interest into a voltage form. For example, resistance may be measured by applying a constant, known current across the resistor of interest and measuring the resulting voltage. In the same way, current is measured by routing it through a resistor of known value and measuring the resulting voltage.

As was also pointed out, presently available digital voltmeters differ in detail as to the particular balancing logic, bridge circuitry, etc., employed in their design. These differences are in detail only and will not affect, in any way, their operative relationship with the audio readout device according to the present invention. Hence, merely coupling the audio readout unit of the present invention to other specific types of digital voltmeters will not involve invention. Also the individual detailed circuits, as described, may obviously take many different forms, as known in the art and described in numerous textbooks, periodical articles, etc., without involving invention.

It will be appreciated, of course, by those skilled in the art, that the foregoing disclosure relates only to a detailed preferred embodiment of the invention whose spirit and scope is set forth in the appended claims.

What is claimed is:

1. In combination: a series of stepping switches, each of said stepping switches including a plurality of contact points and a switch arm making contact with one of said plurality of contact points, said plurality of contact points representing a plurality of decimal digit values, respectively, the series of contact points contacted by the switch arms of said series of stepping switches, respectively, representing the overall digital numerical value of an input quantity; a plurality of readout mechanisms corresponding to the plurality of contact points, respectively, each of said readout mechanisms including an input terminal and being responsive to an energization applied to its input terminal for producing an audio readout corresponding to the value represented by its associated contact point; means for electrically coupling each of the contact points of each of said series of stepping switches to the input terminal of its associated readout mechanism; and sequencing means for sequentially energizing the switch arms in said series of stepping switches whereby the readout mechanisms corresponding to the contact points contacted by the switch arms in said series of stepping switches are serially energized to provide an audio output reading representing the numerical value of the plurality of decimal digit values.

2. The combination according to claim 1 wherein said sequencing means includes a stepping switch having a series of contact points corresponding to said series of stepping switches, respectively, said series of contact points being connected to the switch arms in said series of stepping switches, respectively, an energized switch arm and means for stepping said energized switch arm through said series of contact points to thereby energize said series of contact points and hence the switch arms in said series of stepping switches to produce said audio output reading.

3. The combination according to claim 2 including, in addition, an additional readout mechanism responsive to the placement of the decimal point in the digital numerical value for producing an audio output reading of the decimal point in its proper place in the series of digits read out by said plurality of readout mechanisms.

4. An audio readout unit for use with a self-balancing digital voltmeter, said voltmeter including a series of stepping switches corresponding to the series of decimal digit places forming the output reading of the voltmeter, each of said stepping switches including a plurality of contact points and a switch arm, the contact points contacted by the switch arms in said series of stepping switches representing the series of specific digit values, respectively, constituting the voltmeter reading, said readout unit comprising: a recorded medium including a plurality of channels corresponding to the plurality of contact points, respectively, in each of said series of stepping switches, each of said channels being responsive when energized for producing an output audio reading of the digit value recorded thereon; scanning means for serially energizing the switch arms in the series of stepping switches in said digital voltmeter whereby the particular contact points contacted by the switch arms in said series of stepping switches are serially energized; and means for applying each of the contact point energizations produced by the last-named means to the channel of said recorded medium corresponding thereto whereby a series of audio output readings are made which correspond to the voltage reading made by the voltmeter.

5. The audio readout unit according to claim 4 including, in addition, additional readout means responsive to the placement of the decimal point in the voltmeter output reading for producing an output audio reading of the decimal point in its proper place in the series of digits read out by said plurality of energized channels.

6. The audio readout unit according to claim 5 including, in addition, selectively operable means for selecting any one of the plurality of channels of said recorded medium, and first manually operable means responsive when operated for rerecording the channel selected by said selectively operable means.

7. The audio readout unit according to claim 6 including, in addition, second manually operable means responsive when operated for energizing the channel selected by said selectively operable means whereby the recording on any rerecorded channel may be monitored.

8. An audio readout unit for use with a self-balancing digital voltmeter, said voltmeter including a series of stepping switches corresponding to the series of digit places forming the output number reading of the voltmeter, each of said stepping switches including a switch arm and a plurality of contact points representing a plurality of different decimal digits, respectively, the contact points contacted by the switch arms in said series of stepping switches representing the specific series of decimal digits, respectively, of the voltmeter reading, said audio readout unit comprising: a plurality of energizable means corresponding to the plurality of contact points, respectively, in each of said stepping switches, each of said energizable means being responsive when energized for producing an output audio readout corresponding to the value of its associated decimal digit; scanning means for sequentially energizing the contact arms in said series of stepping switches whereby the contact points contacted by the contact arms in said series of stepping switches are successively energized; and means for applying the energization applied to each contact point by the last-named means to its associated energizable means whereby a series of audio output digit readings are produced which represent the value of the voltmeter reading.

9. The audio readout unit according to claim 8, wherein said digital voltmeter includes, in addition, a range stepping switch for determining the range of the voltmeter reading, said range stepping switch including a switch arm and a number of effective contact points corresponding to the number of different voltmeter ranges, the position of the range stepping arm determining the range of the voltmeter output reading and hence the placement of the decimal point in the voltmeter reading, said audio readout unit including, in addition, additional energizable means responsive when energized for producing an output audio readout representing the decimal point, and said scanning means including, in addition, means responsive to the position of the stepping arm in the range stepping switch of the digital voltmeter for energizing said additional readout means in the proper place during the sequential energization of the contact arms of said series of stepping switches for inserting the decimal point in the output audio reading produced by said readout unit.

10. An audio readout unit for use with a self-balancing digital voltmeter, said voltmeter including a series of stepping switches corresponding to the series of digit places forming the output number reading of the voltmeter, each of said stepping switches including a switch arm and a plurality of contact points representing a plurality of different decimal digits, the contact points contacted by the switch arms in said series of stepping switches at any time corresponding to the series of decimal digits, respectively, represented by the voltmeter reading, said voltmeter also including a range stepping switch including a switch arm and a predetermined number of effective contact points corresponding to the number of voltmeter ranges, the effective contact point contacted by the switch arm in said range stepping switch representing the decimal point placement in said output reading, said readout unit comprising: a plurality of energizable means corresponding to the plurality of contact points, respectively, in each of said stepping switches, each of said energizable means being responsive when energized for producing an output audio reading corresponding to the value of the decimal digit represented by its associated decimal digit; additional energizing means responsive when energized for producing an audio readout representing the decimal point; a number of sequencing means corresponding to the predetermined number of effective contact points on said range stepping switch, respectively, each of said sequencing means being responsive when actuated for ordering a predetermined combined sequence of energizations of said series of energizable means and said additional energizable means whereby the energization of said additional energizable means occurs in the combined sequence at a point corresponding to the switch arm contact position in said range stepping switch and hence the placement of the decimal point in the output reading of said voltmeter; and means for actuating the sequencing means corresponding to the contact point contacted by the switch arm in said range stepping switch whereby an output audio reading is made which includes the decimal point inserted properly with the series of digits representing the voltmeter reading.

References Cited in the file of this patent

UNITED STATES PATENTS

| | | |
|---|---|---|
| 2,362,918 | Miller | Nov. 14, 1944 |
| 2,435,066 | Barsh | Jan. 27, 1948 |